(12) United States Patent
Hosur et al.

(10) Patent No.: US 7,457,381 B1
(45) Date of Patent: Nov. 25, 2008

(54) SPREAD SPECTRUM MULTIPATH COMBINATION

(75) Inventors: Srinath Hosur, Plano, TX (US); Alan Gatherer, Richardson, TX (US); Eko N. Onggosanusi, Madison, WI (US)

(73) Assignee: Texas Instruments Incorporated, Dallas, TX (US)

( * ) Notice: Subject to any disclaimer, the term of this patent is extended or adjusted under 35 U.S.C. 154(b) by 1807 days.

(21) Appl. No.: 09/659,431

(22) Filed: Sep. 8, 2000

Related U.S. Application Data

(60) Provisional application No. 60/152,974, filed on Sep. 9, 1999.

(51) Int. Cl.
*H04B 7/10* (2006.01)
*H04L 1/02* (2006.01)

(52) U.S. Cl. .............. 375/347; 375/146; 375/147; 375/267; 375/295; 455/65; 455/506

(58) Field of Classification Search ............ 375/346, 375/347, 348, 349, 267, 136, 147, 146, 295; 370/342, 320, 335, 441; 455/303, 65, 506; 342/382

See application file for complete search history.

(56) References Cited

U.S. PATENT DOCUMENTS

| | | | | |
|---|---|---|---|---|
| 5,819,168 A | * | 10/1998 | Golden et al. | 455/303 |
| 5,937,333 A | * | 8/1999 | Sexton et al. | 455/73 |
| 5,999,131 A | * | 12/1999 | Sullivan | 342/465 |
| 6,044,120 A | * | 3/2000 | Bar-David et al. | 375/347 |
| 6,067,324 A | * | 5/2000 | Harrison | 375/267 |
| 6,167,039 A | * | 12/2000 | Karlsson et al. | 370/342 |

OTHER PUBLICATIONS

Brunner et al., Adaptive Space-Frequnecy Rake Receivers for WCDMA, 1999 IEEE International Conference, vol. 4, pp. 2383-2386, Mar. 1999.*

* cited by examiner

*Primary Examiner*—Ted Wang
(74) *Attorney, Agent, or Firm*—Ronald O. Neerings; Wade James Brady, III; Frederick J. Telecky, Jr.

(57) ABSTRACT

Multipath relative channel estimations for weighting maximal ratio combining of RAKE detectors in wireless communication systems uses maximal eigenvectors of covariance matrices of path signals. Estimates for close-in and outlying sets of symbols provides linear time change channel estimation.

6 Claims, 4 Drawing Sheets

↑ = BASE TRANSCEIVER STATION (BTS)

MTSO = MOBILE TELEPHONE SWITCHING OFFICE

🚗 = MOBILE UNIT (MOBILE STATION)

------ = DEDICATED LINES

SPREAD SPECTRUM MULTIPATH COMBINATION

CROSS-REFERENCE TO RELATED APPLICATIONS

This application claims priority from provisional application Ser. No. 60/152,974, filed Sep. 9, 1999.

BACKGROUND OF THE INVENTION

The present invention relates to digital communications, and more particularly to multipath signal combination systems and methods.

Spread spectrum wireless communications utilize a radio frequency bandwidth greater than the minimum bandwidth required for the transmitted data rate, but many users may simultaneously occupy the bandwidth. Each of the users has a pseudo-random code for "spreading" information to encode it and for "despreading" (by correlation) received spread spectrum signals and recovery of information. FIG. 2 shows a system block diagram, and FIG. 3 illustrates a QPSK (qaudrature phase-shift keying) encoder with pseudo-noise spreading. Such multiple access typically appears under the name of code division multiple access (CDMA). The pseudo-random code may be an orthogonal (Walsh) code, a pseudo-noise (PN) code, a Gold code, or combinations (modulo-2 additions) of such codes. After despreading the received signal at the correct time instant, the user recovers the corresponding information while other users' interfering signals appear noise-like. For example, the interim standard IS-95 for such CDMA communications employs channels of 1.25 MHz bandwidth and a pseudo-random code pulse (chip) interval $T_c$ of 0.8138 microsecond with a transmitted symbol (bit) lasting 64 chips. The recent wireband CDMA (WCDMA) proposal employs a 3.84 MHz bandwidth and the CDMA code length applied to each information symbol may vary from 4 chips to 256 chips. Indeed, UMTS (universal mobile telecommunications system) approach UTRA (UMTS terrestrial radio access) provides a spread spectrum cellular air interface with both FDD (frequency division duplex) and TDD (time division duplex) modes of operation. UTRA currently employs 10 ms duration frames partitioned into 15 time slots with each time slot consisting of 2560 chips ($T_c$=0.26 microsecond).

The CDMA code for each user is typically produced as the modulo-2 addition of a Walsh code with a pseudo-random code (two pseudo-random codes for QPSK modulation) to improve the noise-like nature of the resulting signal. A cellular system as illustrated in FIG. 4 could employ IS-95 or WCDMA for the air interface between the base station and the mobile user station.

A spread spectrum receiver synchronizes with the transmitter by code acquisition followed by code tracking. Code acquisition performs an initial search to bring the phase of the receiver's local code generator to within typically a half chip of the transmitter's, and code tracking maintains fine alignment of chip boundaries of the incoming and locally generated codes. Conventional code tracking utilizes a delay-lock loop (DLL) or a tau-dither loop (TDL), both of which are based on the well-known early-late gate principle.

The air interface leads to multipath reception, so a RAKE receiver has individual demodulators (fingers) tracking separate paths and combines the finger results to improve signal-to-noise ratio (SNR). The combining may use a method such as the maximal ratio combining (MRC) in which the individual detected signals in the fingers are synchronized and weighted according to their signal strengths or SNRs and summed to provide the decoding statistic as illustrated in FIGS. 5a-5b. That is, a RAKE receiver typically has a number of DLL or TDL code tracking loops together with control circuitry for assigning tracking units to the strongest received paths. Also, an antenna array could be used for directionality by phasing the combined signals from the antennas.

However, known multipath combination methods have problems including robustness.

SUMMARY OF THE INVENTION

The present invention provides a multipath received signal combination covariance matrix eigenvector components used for relative path weightings. Linear approximations of channel response provide models for covariance matrix analysis.

This has the advantages of a robust maximal ratio combination. Also the technique can be blind; that is, it does not require pilot symbols.

BRIEF DESCRIPTION OF THE DRAWINGS

The drawings are heuristic for clarity.

DESCRIPTION OF THE PREFERRED EMBODIMENTS

Overview

Figure 1A:
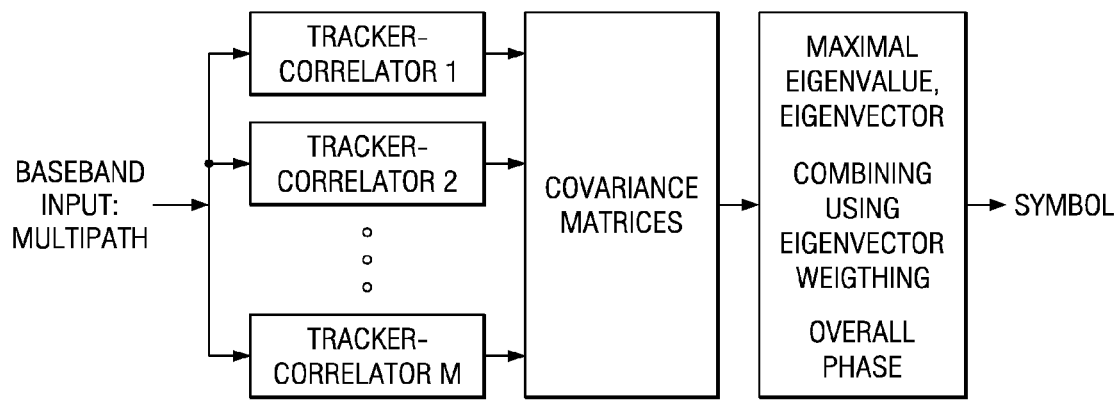
FIGS. 1a-1c show a preferred embodiment detector, linear approximation, and flow diagram for multipath combining.
Figure 1B:
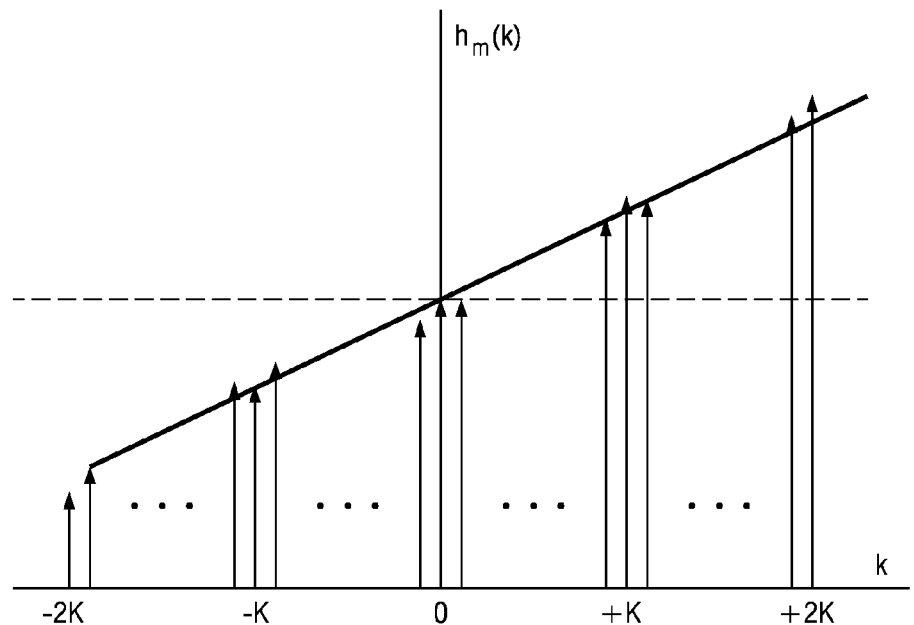
Figure 1C:
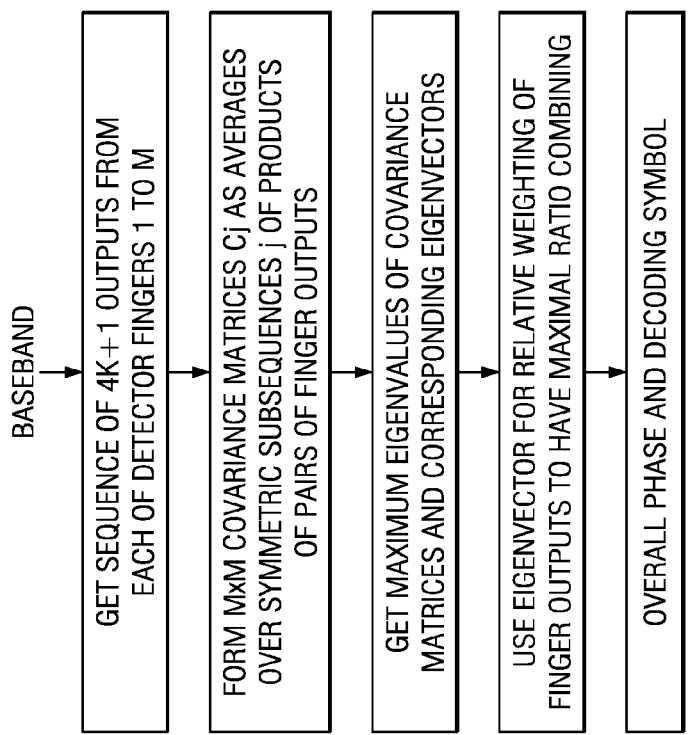
Figure 2:
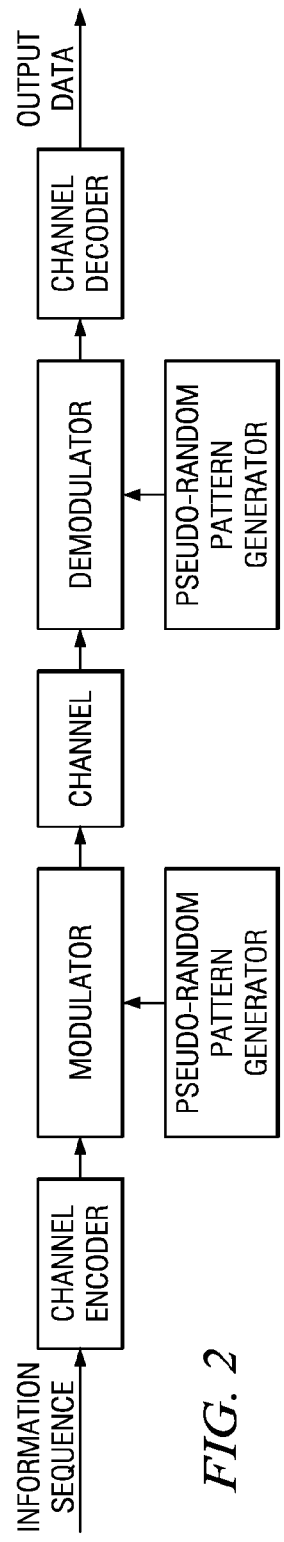
FIG. 2 shows a CDMA communications in block diagram.
Figure 3:
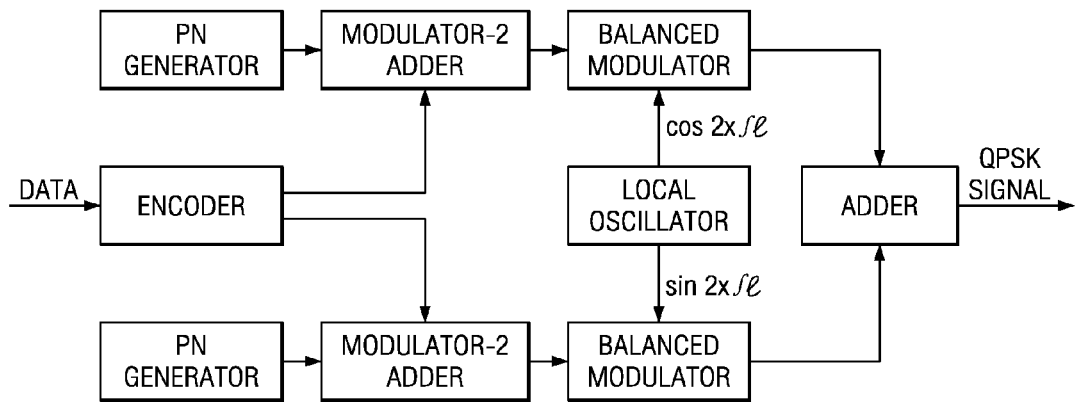
FIG. 3 illustrates a CDMA encoder.
Figure 4:
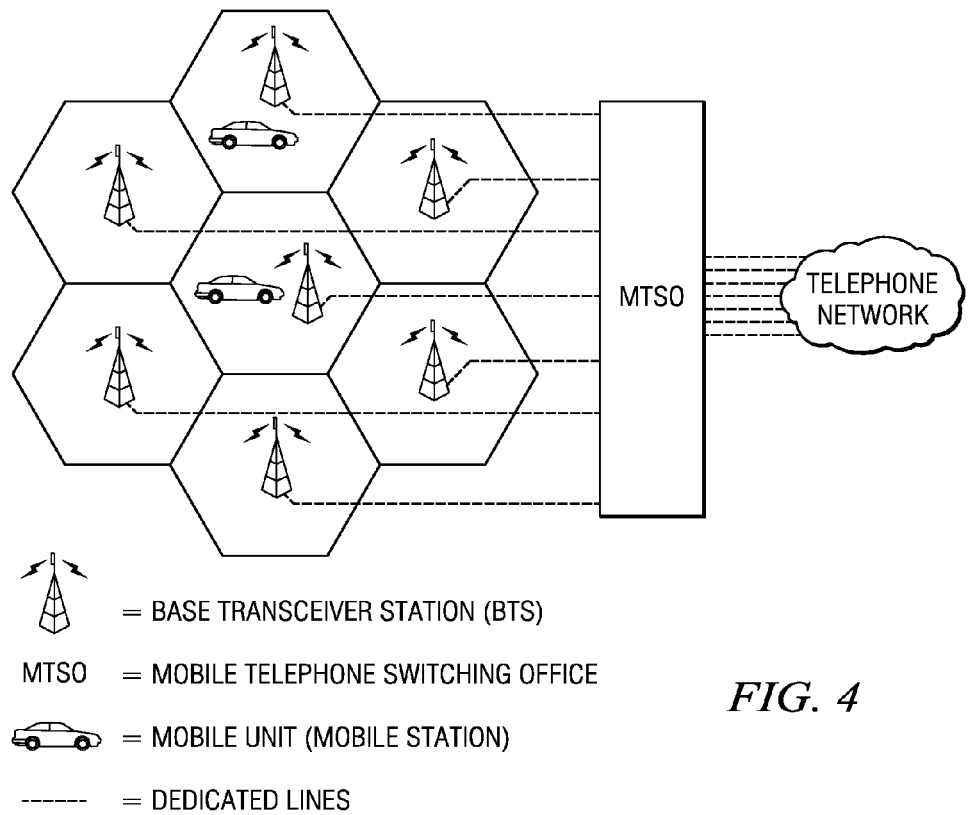
FIG. 4 indicates cellular communications.
Figure 5A:
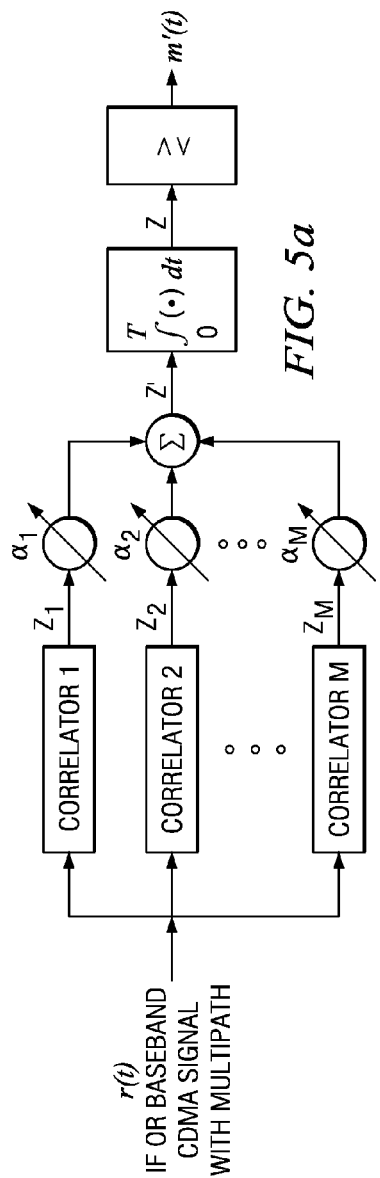
FIGS. 5a-5b illustrate RAKE receiver fingers and antenna array.
Figure 5B:
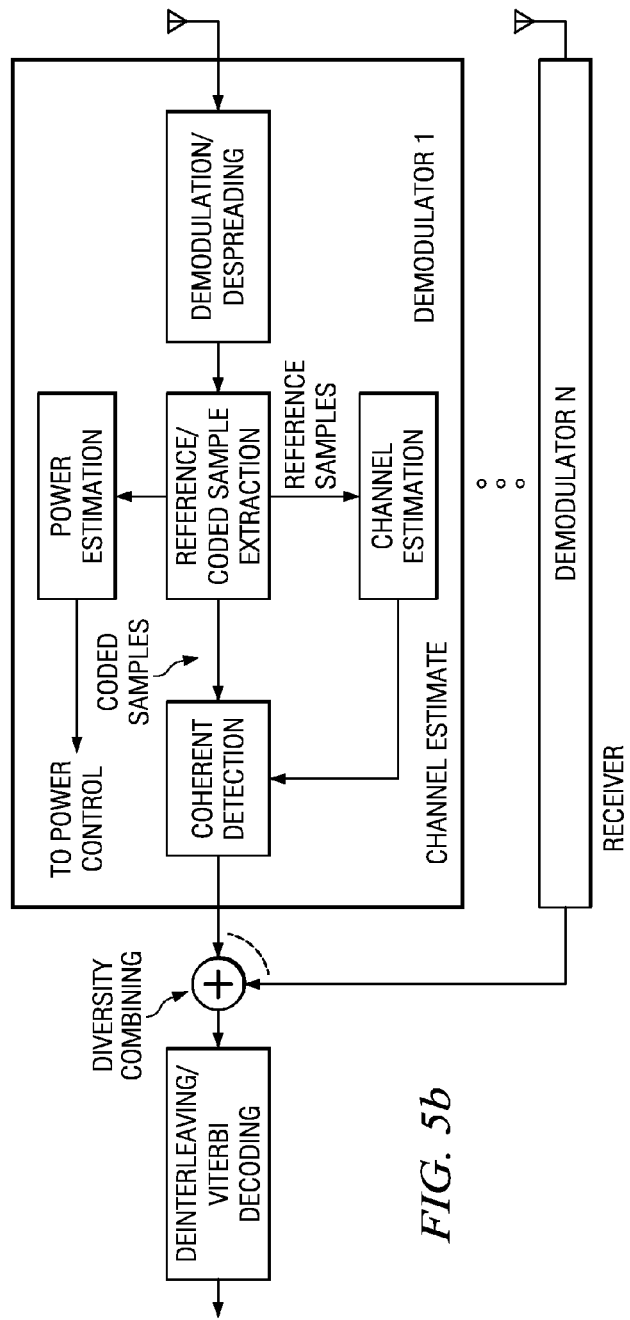

Preferred embodiment spread spectrum communications systems use preferred embodiment blind (without synchronization) maximal ratio combining (MRC) methods with multipath detectors. Preferred embodiment MRC methods estimate time varying multipath channels using eigenvectors associated with maximal eigenvalues of matrices correlating individual path outputs. Local linear approximations of channel parameter variation over time simplify the matrix analysis. FIG. 1a illustrates a preferred embodiment RAKE detector which may apply the preferred embodiment MRC methods. FIG. 1b suggests the channel parameter linear approximation, and FIG. 1c is a flow diagram. In contrast, the known MRC methods estimate each path separately and then combine with weightings proportional to path output power.

The preferred embodiment MRC methods include updating channel estimates both on a symbol-by-symbol basis and on a slot (sequence of symbols) basis. For an updating on a symbol-by-symbol basis, the path covariance analysis averages over output sequences from each path where the output sequences have length 4K+1 and are centered about the symbol interval for updating; thus each updating requires new covariance matrices. Typically, for WCDMA take K in the range of roughly 20 to 40, depending upon the Doppler rate and the symbol rate (32 KSPS channel). For an updating on a slot basis, the channel estimates for all of the 4K+1 symbol intervals in the slot derive from the a single set of covariance matrices over the length 4K+1 output sequences. This amounts to a linear approximation of the channel over the slot.

Interim standard IS-95 and wideband CDMA (WCDMA) proposals include a pilot signal which is much stronger than the data signals and can be used for preferred embodiment overall channel estimation.

In preferred embodiment communications systems base stations and mobile users could each include one or more digital signal processors (DSP's) and/or other programmable devices with stored programs for performance of the signal processing of the preferred embodiment synchronization methods. Alternatively, specialized circuitry could be used. The base stations and mobile users may also contain analog integrated circuits for amplification of inputs to or outputs from antennas and conversion between analog and digital; and these analog and processor circuits may be integrated on a single die. The stored programs may, for example, be in ROM or flash EEPROM integrated with the processor or external. The antennas may be parts of receivers with multiple finger RAKE detectors for each user's signals. Exemplary DSP cores could be in the TMS320C6x or TMS320C5x families from Texas Instruments.

Symbol-by-Symbol Update Preferred Embodiments

Preferred embodiments estimate the multiple paths of a received signal and perform MRC for detection of a transmitted symbol $s(0)$ from a sequence of transmitted symbols $s(k)$. The received baseband signal at a RAKE detector can be expressed as the real part of $$r(t)=\Sigma_k \Sigma_m h_m(k) s(k) c(t-kT-\tau_m(k)) + \text{noise}(t)$$

where T denotes the time interval of a symbol, c( ) denotes the pseudo-random code of values ±1 (and equals 0 outside of the interval [0,T]), and m indexes the multipath with relative delay $\tau_m(k)$ and channel gain and phase $h_m(k)$ during symbol $s(k)$ propagation. Presume normalized symbols: $|s(k)|^2=1$. Each RAKE detector finger tracks and despreads (correlates) one of the multipaths using c( ) to despread and synchronize. Let $y_m(k)=h_m(k)s(k)+v_m(k)$ denote the mth finger output where $v_m(k)$ models noise along the mth path. Indeed, take the $v_m(k)$ to be independent, normally distributed, and with standard deviation σ. Then MRC weights the outputs $y_m(k)$ according to their power and phase, so ideally the MRC weightings are proportional to $h_m(k)^*$ and the MRC decoding statistic with θ the overall phase would be $$e^{j\theta} \Sigma_m y_m(k) h_m(k)^*$$

The expectation of $y_m(k)$ over a sequence of ks is approximately 0 because $s(k)$ is randomly ±1, ±j (assuming QPSK modulation) and varies more rapidly than $h_m(k)$; thus consider the M×M covariance matrix C of the synchronized finger outputs with components given by $$C_{m,n}=(\Sigma_k y_m(k) y_n(k)^*)/(4K+1)$$

where the k sum is over the range $-2K \leq k \leq 2K$ with K on the order of 20 to 40. Expressed in matrix form with y(k) the M-dimensional vector of synchronized outputs and $(.)^H$ denoting Hermitian conjugate (adjoint):

$$C=\Sigma_k y(k) y^H(k)/(4K+1)$$

Locally, $h_m(k)$ can be reasonably approximated by low order polynomials in k. Thus consider constant and linear approximations.

1. First consider a time-invariant channel; that is, take $h_m(k)=h_m$ for all k in the range −2K to 2K. With this presumption and using the fact that $s(k)$ is randomly ±1, ±j, the covariance matrix then becomes:

$$C=hh^H+\sigma^2 I$$

where h is the M-component vector with mth component equal to $h_m$. This essentially is a spectral resolution for C and shows that C has one eigenvalue equal to $|h|^2+\sigma^2$ which is associated with the normalized eigenvector h/|h| plus an (M−1)-order eigenvalue equal to $\sigma^2$ which is associated with M−1 (generalized) eigenvectors orthogonal to h. Thus the preferred embodiment proceeds as follows:

(1) form covariance matrix C as averages over sequences of finger outputs.

(2) find $\lambda_{MAX}$, the largest eigenvalue of C, and its associated normalized eigenvector, w, and (3) define the MRC (up to an overall phase) decoding statistic to be $$\Sigma_m w^*_m y_m(0)$$

(4) determine the overall phase of this MRC statistic by any channel estimation method, such as taking fourth powers to eliminate the symbol phase (presumed QPSK modulation) and using a phase-locked loop.

(5) decode the symbol $s(0)$ from the resultant phase-adjusted MRC statistic.

2. Next, consider the case of h(k) varying linearly with time. In particular, presume that for k in the range −2K to 2K:

$$h(k)=\alpha+k\beta$$

where α and β are (unknown) constant M-dimensional vectors. FIG. 1b heuristically illustrates the approximation for a component $h_m(k)$ with the broken horizontal line representing $\alpha_m$ and the slope of the diagonal line $\beta_m$. So approximate h(k) and thereby determine the MRC weightings from estimates for α and β. Thus first define covariance matrices $C_0$ and $C_1$ as the sums over the k intervals $-K \leq k \leq -1$ plus $1 \leq k \leq K$ and $-2K \leq k \leq -(K+1)$ plus $K+1 \leq k \leq 2K$, respectively:

$$C_0=\Sigma_{\pm k=1,K} y(k) y^H(k)/2K$$

$$C_1=\Sigma_{\pm k=K+1,2K} y(k) y^H(k)/2K$$

FIG. 1b illustrates the two portions of the −2K to 2K symbol interval slot used to define the two covariance matrices. Then invoking the presumed linear form of h(k) yields:

$$C_0=\alpha\alpha^H+f_0(K)\beta\beta^H+\Gamma_0+\Psi_0$$

$$C_1=\alpha\alpha^H+f_1(K)\beta\beta^H+\Gamma_1+\Psi_1$$

where $f_0(K)=(2K^2+3K+1)/6$ and $f_1(K)=(14K^2+9K+1)/6$ are the corresponding sums of $k^2$ over the two k ranges, each divided by 2K, and the noise terms $\Gamma_0, \Psi_0, \Gamma_1$, and $\Psi_1$ arise from the y(k)-noise cross terms and noise squared terms in the two sums of $y(k)y^H(k)$ over k. These variables have the following properties: mean($\Gamma_0$)=mean($\Gamma_1$)=0; mean($\Psi_0$)=mean($\Psi_1$)=0; var($\Gamma_0$)=var($\Gamma_1$)=$\sigma^2 \|\alpha\|^2 I$ /2K; and var($\Psi_0$)=var($\Psi_1$)=$\sigma^2 I$ /2K; thus consistent estimates can be obtained.

Estimate α and β essentially by ignoring the noise terms in the foregoing pair of linear equations and solving for $\alpha\alpha^H$ and $\beta\beta^H$ followed by eigenvector analysis. In particular, first define the estimates $$A=(f_1(K)C_0-f_0(K)C_1)/(f_1(K)-f_0(K))$$

$$B=(-C_0+C_1)/(f_1(K)-f_0(K))$$

Thus A estimates $\alpha\alpha^H$+noise terms and B estimates $\beta\beta^H$+ noise terms. As previously described, the largest eigenvalue of A equals $\|\alpha\|^2$+noise variance and has a corresponding normalized eigenvector which estimates $\alpha/\|\alpha\|$ up to an overall phase. Similarly, the largest eigenvalue of B equals $\|\beta\|^2$+ noise variance and has a corresponding normalized eigenvector which estimates $\beta/\|\beta\|$ up to an overall phase.

In short, the preferred embodiment method of MRC for symbol s(0) uses the linearized model of h(k) and includes the following steps:

(1) compute the covariance matrices $C_0$ and $C_1$ from the vector y(k) of synchronized detected RAKE finger signals for symbol index k in the range $-2K$ to $2K$; k=0 corresponds to the symbol of interest for the MRC. That is, $$C_0 = \Sigma_{\pm k=1,K} y(k)y^H(k)/2K$$

$$C_1 = \Sigma_{\pm k=K+1,2K} y(k)y^H(k)/2K$$

(2) generates the estimate A from the covariance matrices $C_0$ and $C_1$ by $$A = (f_1(K)C_0 - f_0(K)C_1)/(f_1(K) - f_0(K))$$

where $f_0(K) = (2K^2+3K+1)/6$ and $f_1(K) = (14K^2+9K+1)/6$.

(3) find the largest eigenvalue, $\lambda_A$, and corresponding normalized eigenvector, $w_A$, of the estimate A.

(4) define the MRC (up to an overall phase) decoding statistic to be $$\Sigma_m w^*_{A,m} y_m(0)$$

(5) determine the overall phase of this MRC statistic by any channel estimation method, and (6) decode the symbol s(0) from the resultant phase-adjusted MRC statistic.

Update Per Slot Preferred Embodiments

The preferred embodiment method of MRC for all ks in a slot of k values from $-2K$ to $+2K$ (such as illustrated in FIG. 1b) again uses the linearized model of h(k) and includes the following steps:

(1) compute the covariance matrices $C_0$ and $C_1$ from the vector y(k) of synchronized detected RAKE finger signals for symbol index k in the range $-2K$ to $+2K$. That is, $$C_0 = \Sigma_{\pm k=1,K} y(k)y^H(k)/2K$$

$$C_1 = \Sigma_{\pm k=K+1,2K} y(k)y^H(k)/2K$$

(2) generate the estimates A and B from the covariance matrices $C_0$ and $C_1$ by $$A = (f_1(K)C_0 - f_0(K)C_1)/(f_1(K) - f_0(K))$$

$$B = (-C_0 + C_1)/(f_1(K) - f_0(K))$$

where $f_0(K) = (2K^2+3K+1)/6$ and $f_1(K) = (14K^2+9K+1)/6$.

(3) find the largest eigenvalues, $\lambda_A$ and $\lambda_B$, and corresponding normalized eigenvectors, $w_A$ and $w_B$, of A and B, respectively. The eigenvalues are real due to all of the matrices $y(k)y^H(k)$ being Hermitian.

(4) estimate the channel for k in the slot as $h'(k) = \sqrt{\lambda_A} w_A + k \sqrt{\lambda_B} w_B$. Because $w_A$ and $w_B$ are only determined up to a phase, use the k=0 case as previously described to determine the overall phase for $w_A$. When s(k) is QPSK, we can compute $\Sigma_{\pm k=1,K}(y^T(k)y(k))^2/2K$ and $\Sigma_{\pm k=K+1,2K}(y^T(k)y(k))^2/2K$. The expressions obtained will be functions of $w_A^T w_A$, $w_B^T w_B$, $\lambda_A$, $\lambda_B$ and the residual phases on $w_A$ and $w_B$. The residual phases can be determined from the resulting equations since we know all the other quantities. In case s(k) is BPSK we only need to use compute $\Sigma_{\pm k=1,K} y^T(k)y(k)/2K$ and $\Sigma_{\pm k=K+1,2K} y^T(k)y(k)/2K$. A combination of this and the phase estimation method for k=0 can also be used to estimate the residual phases. Alternatively, pilots from the transmitter could be used for phase determinations.

(5) use the components of h'(k) for relative weightings in the MRC of y(k) for each k in the slot (k=0,K was already done in step (4)). That is, take the MRC statistic for each k in the slot to be the sum $$\Sigma_m y_m(k) h'_m(k)^*$$

(6) for each k decode the symbol s(k) from the resultant phase-adjusted MRC statistics.

Alternative Preferred Embodiments

Alternative preferred embodiment quadratic (or higher order) approximations for the channel presume $h_m(k) = \alpha_m + k\beta_m + k^2\gamma_m$ and thus divide the sequence of received symbols into three sections and form three covariance matrices to solve for estimates of $\alpha\alpha^H$, $\beta\beta^H + \alpha\gamma^H + \gamma\alpha^H$, and $\gamma\gamma^H$ followed by eigenvalue and eigenvector analysis to estimate $\alpha$, $\beta$, and $\gamma$ and thus h(k) for use in the MRC. Of course, taking k in the interval $-3K$ to $3K$ makes the notation simpler and there are three coefficient factors $f_0(K)$, $f_1(K)$, and $f_2(K)$ as second order polynomials and three more coefficient factors as fourth order polynomials.

Modifications

The preferred embodiments can be modified in various ways while retaining the features of a finding relatively weightings for multipath combining by eigenvector components of path covariance matrices.

For example, instead of updating the MRC coefficients every symbol one can update them every L'th symbol and interpolate or use the same estimates for the symbols in between.

Similarly instead of every slot one can compute every half slot or two slots and interpolate for the values in between.

Other techniques for phase estimation for e.g., decision directed phase estimation.

Other weightings in the multipath combinations could be used; this could involve (fractional) powers of the channel estimation.

What is claimed is:

1. A method of multipath combining, comprising:
    (a) forming a first matrix of covariances of multipath inputs over a first range and a second matrix of covariances of multipath inputs over a second range;
    (b) forming an estimation matrix from said first and second matrices;
    (c) finding an eigenvector of said estimation matrix; and
    (c) combining said multipath inputs relatively weighted according to the components of said eigenvector.

2. The method of claim 1, wherein:
    (a) said eigenvector is associated with a maximal eigenvalue of said estimation matrix.

3. The method of claim 1, wherein:
    (a) said weightings have magnitudes proportional to the squared magnitudes of said eigenvector components and have phases proportional to the phases of said eigenvector phases.

4. The method of claim 1, further comprising:
    (a) forming a second estimation matrix from said first and second matrices;
    (b) finding a second eigenvector of said second estimation matrix; and
    (c) wherein said combining said multipath inputs relatively weighted according to the components of said eigenvector includes relatively weighted also according to the components of said second eigenvector.

5. A multipath receiver, comprising:
    (a) a plurality of detectors, each detector detecting a path of a multipath input;
    (b) first circuitry coupled to said detectors and connected to form a first matrix of covariances of outputs of said detectors over a first range and a second matrix of covariances of outputs of said detectors over a second range;

(c) second circuitry coupled to said first circuitry and connected to form an estimation matrix from said first and second matrices;

(d) third circuitry coupled to said second circuitry and connected to find an eigenvector of said estimation matrix; and (c) fourth circuitry coupled to said third circuitry and connected to combine said outputs relatively weighted according to the components of said eigenvector.

6. The receiver of claim 5, wherein:

(a) said first, second, third, and fourth circuitry include a programmed processor.

* * * * *